United States Patent
Coglitore

(10) Patent No.: US 11,082,471 B2
(45) Date of Patent: Aug. 3, 2021

(54) METHOD AND APPARATUS FOR BONDING COMMUNICATION TECHNOLOGIES

(71) Applicant: R-STOR INC., Saratoga, CA (US)

(72) Inventor: Giovanni Coglitore, Saratoga, CA (US)

(73) Assignee: R-STOR INC., Saratoga, CA (US)

(*) Notice: Subject to any disclaimer, the term of this patent is extended or adjusted under 35 U.S.C. 154(b) by 0 days.

(21) Appl. No.: 15/661,692

(22) Filed: Jul. 27, 2017

(65) Prior Publication Data

US 2018/0034882 A1 Feb. 1, 2018

Related U.S. Application Data

(60) Provisional application No. 62/367,444, filed on Jul. 27, 2016.

(51) Int. Cl.
| | | |
|---|---|---|
| H04L 29/06 | (2006.01) | |
| H04L 12/28 | (2006.01) | |
| H04B 3/54 | (2006.01) | |
| H04W 84/12 | (2009.01) | |

(52) U.S. Cl.
CPC ........ *H04L 65/605* (2013.01); *H04L 12/2838* (2013.01); *H04B 3/542* (2013.01); *H04L 2012/284* (2013.01); *H04W 84/12* (2013.01)

(58) Field of Classification Search
CPC ............... H04B 3/542; H04L 12/2838; H04L 2012/284; H04L 43/0882; H04L 47/41; H04L 65/605; H04W 84/12
See application file for complete search history.

(56) References Cited

U.S. PATENT DOCUMENTS

| | | | | |
|---|---|---|---|---|
| 8,842,653 B1* | 9/2014 | Rao | ........................... | H04B 7/15 370/338 |
| 10,121,225 B1* | 11/2018 | Gerges | ..................... | G06F 17/50 |
| 2006/0062242 A1* | 3/2006 | Dacosta | .................... | H04L 1/22 370/464 |
| 2006/0246911 A1* | 11/2006 | Petermann | ............ | H04W 16/26 455/444 |
| 2008/0281585 A1* | 11/2008 | Feher | ........................ | H04N 7/20 704/201 |
| 2012/0099604 A1* | 4/2012 | Cohen | .................. | H04L 12/2838 370/432 |
| 2013/0201316 A1* | 8/2013 | Binder | ..................... | H04L 67/12 348/77 |
| 2013/0239160 A1* | 9/2013 | Chen | ................... | H04L 41/0816 725/109 |
| 2013/0321586 A1* | 12/2013 | Kirk | ......................... | G06T 15/04 348/47 |

(Continued)

OTHER PUBLICATIONS

International Preliminary Report on Patentability and Written Opinion issued in corresponding International Application No. PCT/US2017/044172 dated Feb. 7, 2019.

*Primary Examiner* — Khaled M Kassim

(74) *Attorney, Agent, or Firm* — Squire Patton Boggs (US) LLP

(57) ABSTRACT

A method and apparatus may include receiving data via a wide pipeline. The wide pipeline comprises a bonding of cable technology, electrical wiring technology, and a wireless technology. The method also includes configuring the data to be transmitted via at least one wireless channel. The method also includes transmitting the data via the at least one wireless channel to a user device.

15 Claims, 4 Drawing Sheets

(56) References Cited

U.S. PATENT DOCUMENTS

| | | | |
|---|---|---|---|
| 2015/0046624 A1* | 2/2015 | Ramirez | G06F 1/1632 |
| | | | 710/303 |
| 2015/0128200 A1* | 5/2015 | Mamidwar | H04N 21/42615 |
| | | | 725/116 |
| 2015/0156261 A1* | 6/2015 | Blake | H04L 69/28 |
| | | | 709/248 |
| 2016/0309340 A1* | 10/2016 | Malach | H04L 5/001 |
| 2017/0295372 A1* | 10/2017 | Lawrence | H04N 19/132 |
| 2017/0302379 A1* | 10/2017 | Bernard | H04L 12/2865 |
| 2018/0284735 A1* | 10/2018 | Cella | G05B 23/024 |

* cited by examiner

METHOD AND APPARATUS FOR BONDING COMMUNICATION TECHNOLOGIES

CROSS REFERENCE TO RELATED APPLICATION

This application claims priority to U.S. Provisional Application No. 62/367,444 filed on Jul. 27, 2016. The entire contents of the above-referenced provisional application in hereby incorporated by reference

BACKGROUND

Field

Certain embodiments of the present invention may relate to bonding communication technologies.

Description of the Related Art

Different technologies enable distribution of video and other content within a home. One example use of the distributed video and content is within virtual-reality applications. Virtual reality may generate/simulate a physical environment. Users of the virtual reality may interact within the simulated virtualized environment. The imagery of the virtualized environment may be displayed via a computer screen or via a headset. The virtualized environment may resemble physical locations in the real world or may resemble locations of an imaginary world.

SUMMARY

According to a first embodiment, a method can include receiving, by routing device, data via a wide pipeline. The wide pipeline includes a bonding of cable technology, electrical wiring technology, and a wireless technology. The method also includes configuring the data to be transmitted via at least one wireless channel. The method also includes transmitting the data via the at least one wireless channel to a user device.

In the method of the first embodiment, the cable technology corresponds to Multimedia over Coaxial technology.

In the method of the first embodiment, the electrical wiring technology corresponds to Homeplug technology.

In the method of the first embodiment, the wireless technology corresponds to Wi-Fi Certified ac.

In the method of the first embodiment, configuring the data includes configuring the data to be transmitted via at least one Wi-Gig channel.

In the method of the first embodiment, transmitting the data includes transmitting the data to a virtual reality head set.

According to a second embodiment, an apparatus can include at least one processor. The apparatus can also include at least one memory including computer program code. The at least one memory and the computer program code can be configured, with the at least one processor, to cause the apparatus at least to receive data via a wide pipeline. The wide pipeline comprises a bonding of cable technology, electrical wiring technology, and a wireless technology. The apparatus can also be caused to configure the data to be transmitted via at least one wireless channel. The apparatus can also be caused to transmit the data via the at least one wireless channel to a user device.

In the apparatus of the second embodiment, the cable technology corresponds to Multimedia over Coaxial technology.

In the apparatus of the second embodiment, the electrical wiring technology corresponds to Homeplug technology.

In the apparatus of the second embodiment, the wireless technology corresponds to Wi-Fi Certified ac.

In the apparatus of the second embodiment, configuring the data comprises configuring the data to be transmitted via at least one Wi-Gig channel.

In the apparatus of the second embodiment, transmitting the data comprises transmitting the data to a virtual reality head set.

According to a third embodiment, a computer program product can be embodied on a non-transitory computer readable medium, the computer program product configured to control a processor to perform a method according to the first embodiment.

BRIEF DESCRIPTION OF THE DRAWINGS

For proper understanding of the invention, reference should be made to the accompanying drawings, wherein.

DETAILED DESCRIPTION

Figure 1:
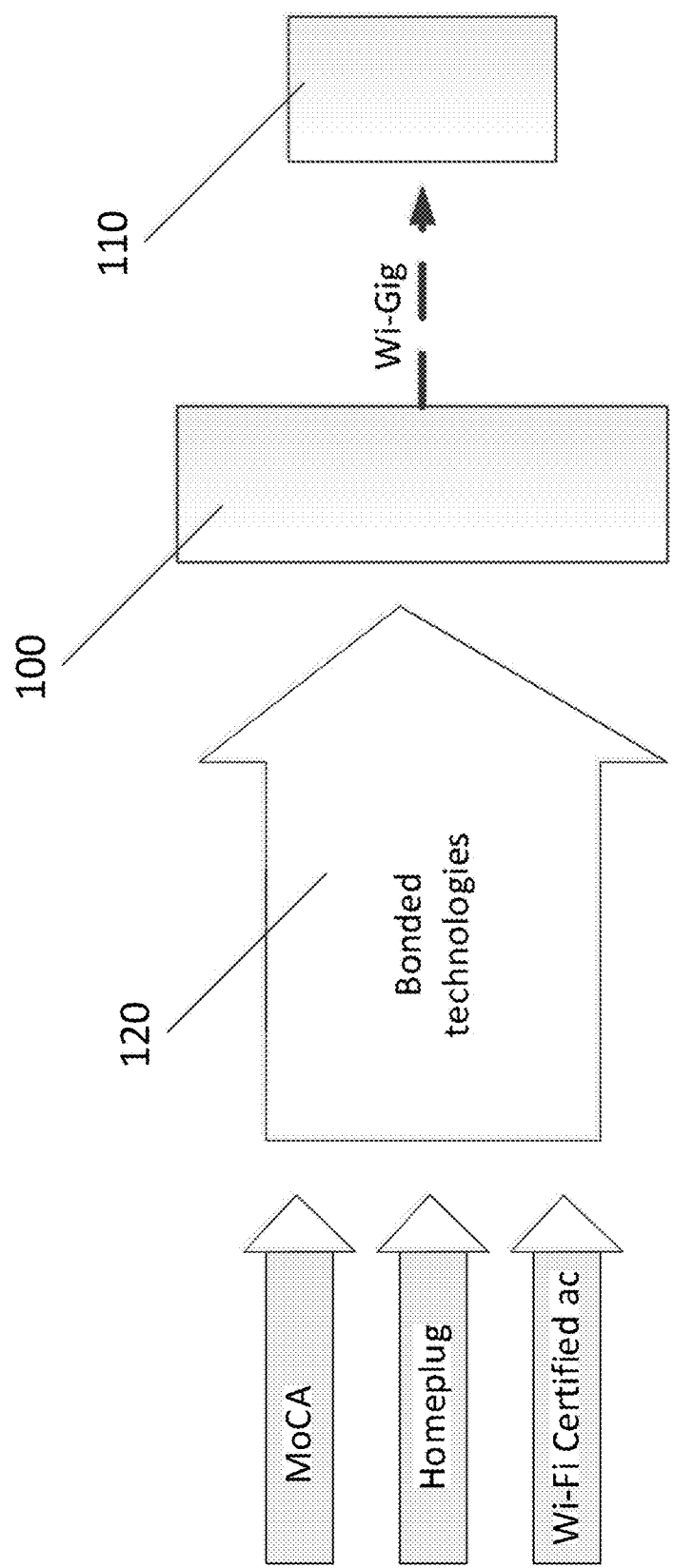
FIG. 1 illustrates bonding technologies and transmitting data via a wider pipeline, in accordance with certain embodiments of the present invention.

Certain embodiments of the present invention may relate to bonding communication technologies. As technological applications become increasingly complex, these applications also become increasingly data intensive. In addition to processing increasing amounts of data, these applications also receive increasing amounts of data. In other words, more data needs to be inputted into these applications.

For example, as new virtual reality (VR) applications are developed, VR headsets will likely require more data to be inputted as compared to the amount of data that is input into traditional technological applications.

For example, the imagery that is presented within a VR headset may be far more advanced as compared to the imagery presented by a traditional application such as, for example, a traditional high-definition television. As such, in order to function properly, VR headsets may require far more inputted data as compared to the data that is input into high-definition televisions.

The need for data is further increased when a group of VR users gather together. Specifically, a group of VR users may congregate within a single room. For example, a group of four virtual reality headsets may be used within a single room, where each virtual reality headset requires its own pipeline of inputted data.

One possible method for providing the necessary data to each virtual reality headset is to use wires to directly provide data from a high-performance computer to each headset. By using wires, large amounts of data can be directly transmitted into each headset from the high performance computer. However, many users may consider the use of wires to be unwieldy, and many users may prefer not to house a high-performance computer in the same room as the VR headsets.

Therefore, users of virtual reality may prefer a method where data is provided to each VR headset using wireless technology. By using wireless technology, the use of unwieldy wires can be avoided, and the users need not have a high-performance computer within the vicinity of their headsets.

However, although users may prefer to use wireless technology to provide data to each headset, the current wireless technologies are not capable of providing the necessary data throughput to the VR headsets.

In view of the above-described shortcomings, certain embodiments may be directed to method of data transmission that transmits data at a rate that satisfies data intensive requirements, such as the requirements of VR applications. Certain embodiments may implement this method of data transmission by bonding a plurality of technologies that each transmit high definition content. By bonding a plurality of technologies together, a higher throughput can be achieved in order to transmit the high definition content. For example, certain embodiments may bond Ethernet technologies, such as bonding, at least, a cable technology (such as, for example, Multimedia over Coaxial (MoCA) technology) and an electrical wiring technology (such as, for example, Homeplug technology).

As described above, certain embodiments may bond Ethernet technologies, such as Multimedia over Coaxial (MoCA) technology and Homeplug technology. MoCA technology generally refers to a communication technology that runs over existing in-home coaxial cabling. Homeplug technology generally refers to a communication technology that runs over existing home electrical wiring. Although neither MoCA nor Homeplug can, by themselves, deliver sufficient data throughput to satisfy the data-intensive needs of VR headsets, a bonding between these two technologies can create a wider pipeline for a greater throughput of data.

In addition to combining technologies such as MoCA and Homeplug, certain other embodiments can also bond a wireless technology (such as, for example, Wi-Fi Certified ac technology) within the bundle of bonded technologies. Wi-Fi Certified ac is generally understood as a generation of Wi-Fi technology that can deliver data at a rate of up to a gigabit per second.

By bonding the three different Ethernet technologies, certain embodiments may implement a 3 Gbit/s link, corresponding to a transfer rate that meets the transfer speeds of the USB 3.0 standard. USB 3.0 is generally understood as a standard where data may be transferred at a rate of up to 5 Gbit/s. With regard to the implemented 3 Gbit/s link, 1 Gbit/s of the link may correspond to the data that is transmittable via MoCA, another 1 Gbit/s of the link may correspond to the data transmittable via Homeplug, and another 1 Gbit/s of the link may correspond to the data transmittable via Wi-Fi Certified ac.

After different Ethernet technologies are bonded together, certain embodiments of the present invention may then convert/configure data received via the bonded technologies into data that is transmitted via multiple wireless channels. Thus, certain embodiments may convert the bonded technologies into Wi-Gig channels. The conversion may occur within a wireless routing device, as described in more detail below. Data may then be transmitted via these Wi-Gig channels to the VR headsets of the users. In other words, a wireless routing device may receive data via the bonded channel, and may then convert the received data (from the bonded channel) into wireless transmissions, such as Wi-Gig transmissions. The wireless routing device becomes an access point that transmits to, for example, the VR headsets.

As described above, certain embodiments may bond different technologies, and then distribute the data transmitted over the bonded technologies over wireless channels. For example, certain embodiments distribute the data (received over the bonded technologies) over Wi-Gig channels to the VR headsets. Thus, the Wi-Gig channels may together create a wider pipeline for the transmission of data, as compared to the previous approaches. Therefore, data can be transmitted via the bonded technologies, and then be transmitted via the Wi-Gig channels. For example, the wider pipeline of the bonded technologies and the Wi-Gig channels may be used to transmit data of 4K images into a virtual reality (VR) head set.

Wi-Gig is generally understood as a multi-gigabit speed wireless communication technology that operates over an unlicensed 60 GHz frequency band. Wi-Gig is also generally understood as a short-range transmission technology that transmits communications over a range of about 6 meters.

FIG. 1 illustrates bonding technologies and transmitting data via a wider pipeline, in accordance with certain embodiments of the present invention. In the example of FIG. 1, three different technologies are bonded together. However, in other embodiments, the number of bonded technologies can be more or less than three. Specifically, in this example, a cable technology (MoCA), an electrical wiring technology (Homeplug), and a wireless technology (Wi-Fi Certified ac) are combined together. The data is transmitted to a wireless routing device 100 via the wide pipeline 120 of the bonded technologies. The wireless routing device 100 can then convert/configure the data, and then wirelessly transmit the converted/configured data via Wi-Gig channels to a user device 110 (i.e., a VR head set, for example).

With certain embodiments, the wider pipeline of the bonded technologies and the Wi-Gig channels may directly provide content to a plurality of headsets. If there are 4 VR headsets in a room (with a corresponding 3 bonded channels associated with each headset), there is generally no cross-contamination between the headsets in the room and any devices in other rooms. Cross-contamination across rooms may be avoided because the wall-propagation characteristics of Wi-Gig are generally low. Therefore, the short range of Wi-Gig can provide the benefit of avoiding cross-contamination across rooms.

The previous approaches of providing wireless data to technological applications teach away from the above-described embodiments that bond a plurality of technologies (where each technology transmits high definition content). Specifically, the previous approaches clearly focused on separating/disaggregating each of the distinct/disparate technologies. In accordance with the previous approaches, MoCA, Wi-Fi ac, and Homeplug are clearly separated. The previous approaches are directed to separately improving each technology (i.e., separately improving MoCA, Wi-Fi, etc.), which clearly teaches away from combining these disparate technologies. In other words, the previous approaches focused on separately improving the data throughput of each of the separate technologies, and did not suggest combining/bonding the separate technologies. Therefore, the previous approaches teach away from the bonding a plurality of technologies, as proposed by certain embodiments of the present invention.

Figure 2:
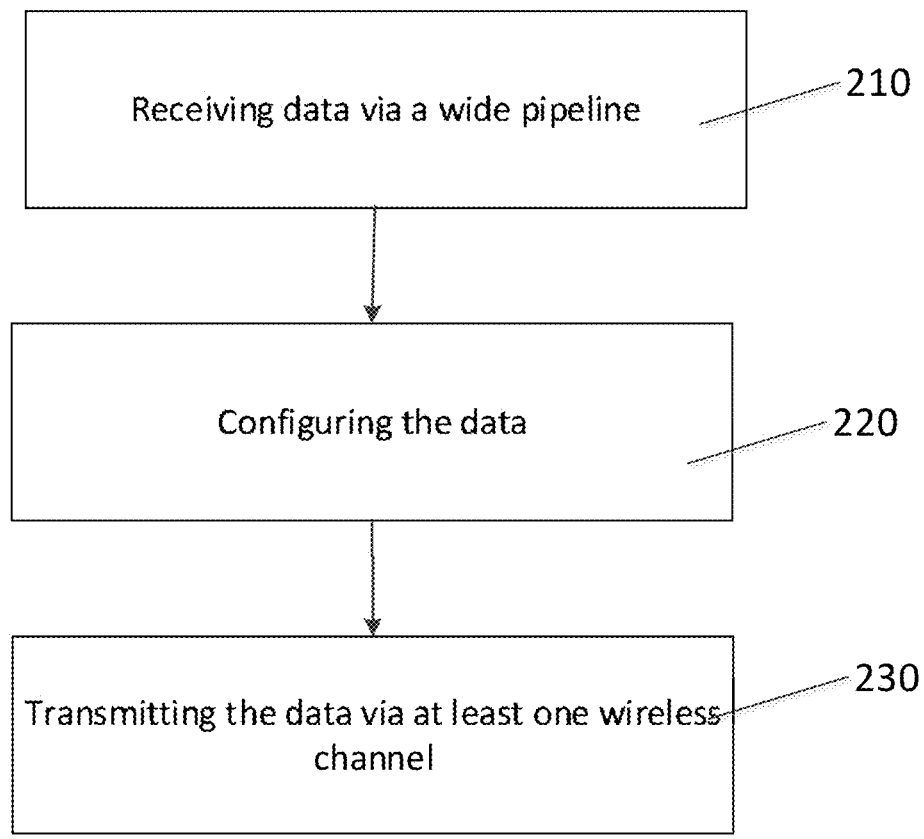
FIG. 2 illustrates a flowchart of a method in accordance with certain embodiments of the invention.

FIG. 2 illustrates a flowchart of a method in accordance with certain embodiments of the invention. The method illustrated in FIG. 2 includes, at 210, receiving, by routing device, data via a wide pipeline. The wide pipeline comprises a bonding of cable technology, electrical wiring technology, and a wireless technology. The method also includes, at 220, configuring the data to be transmitted via at least one wireless channel. The method also includes, at 230, transmitting the data via the at least one wireless channel to a user device.

Figure 3:
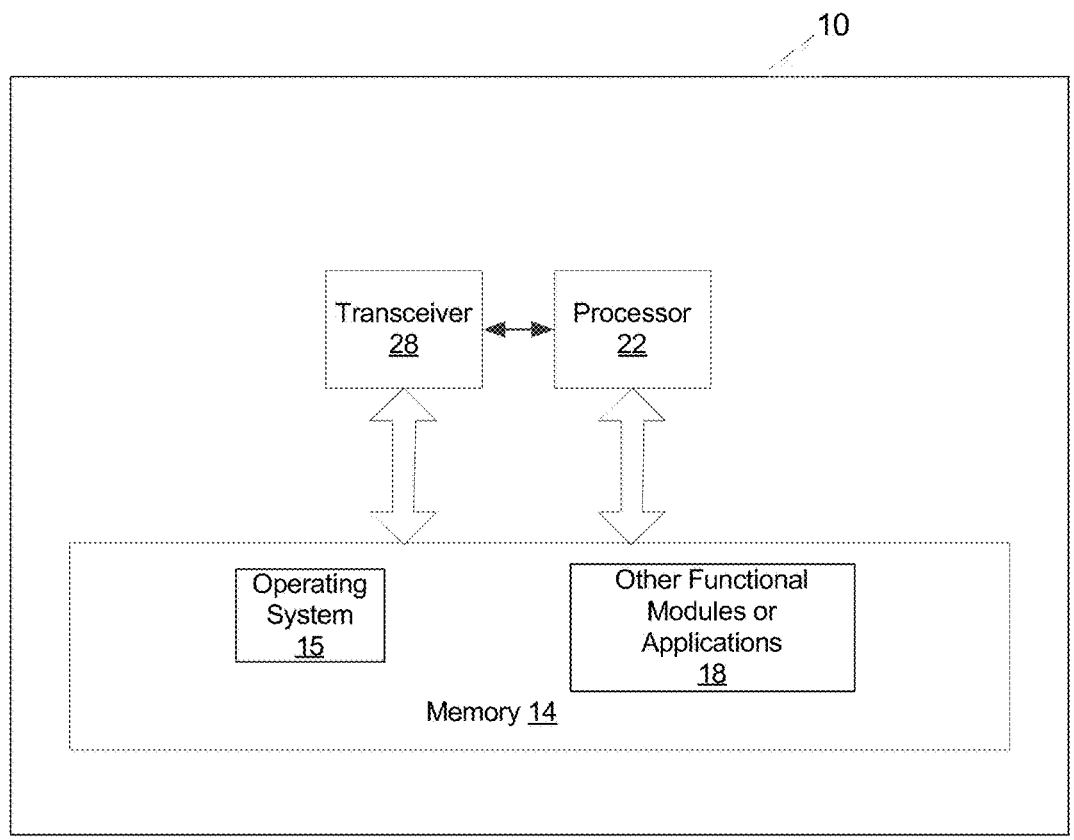
FIG. 3 illustrates an apparatus according to certain embodiments of the present invention.

FIG. 3 illustrates an apparatus 10 according to certain embodiments of the present invention. It should be understood that the signals or blocks in FIGS. 1, 2, and 4 may be implemented by various means or their combinations, such as hardware, software, firmware, one or more processors and/or circuitry. In an embodiment, apparatus 10 may be a routing device. In other embodiments, apparatus 10 may be a user device.

Apparatus 10 includes a processor 22 for processing information and executing instructions or operations. Processor 22 may be any type of general or specific purpose processor. While a single processor 22 is shown in FIG. 3, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein. For firmware or software, the implementation may include modules or units of at least one chip set (for example, procedures, functions, and so on).

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

In one embodiment, apparatus 10 may be configured to receive data via a wide pipeline. The wide pipeline comprises a bonding of cable technology, electrical wiring technology, and a wireless technology. Apparatus 10 can also be configured to configure the data to be transmitted via at least one wireless channel. Apparatus 10 can also be configured to transmit the data via the at least one wireless channel to a user device.

Figure 4:
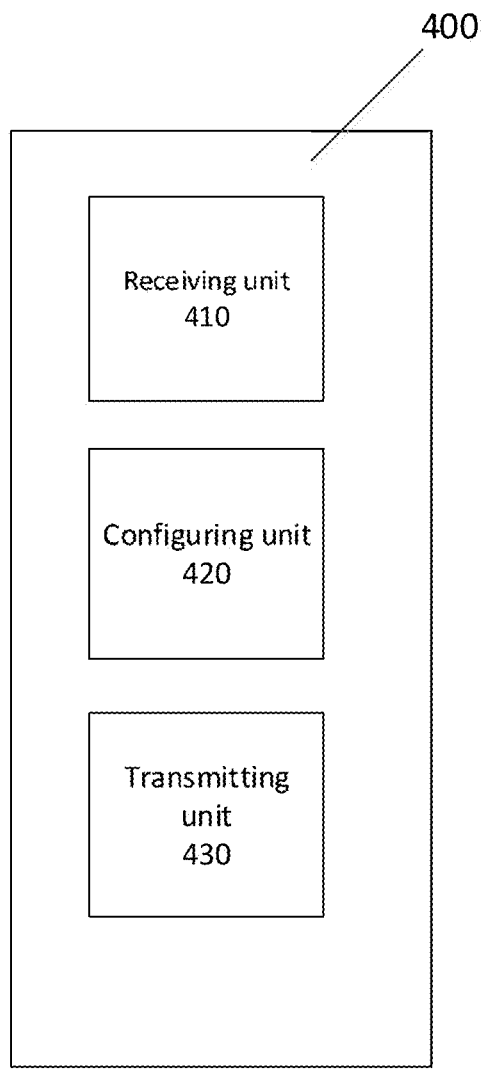
FIG. 4 illustrates another apparatus in accordance with certain embodiments of the invention.

FIG. 4 illustrates another apparatus in accordance with certain embodiments of the invention. Apparatus 400 can be a wireless routing device, for example. Apparatus 400 can include a receiving unit 410 that receives data via a wide pipeline. The wide pipeline comprises a bonding of cable technology, electrical wiring technology, and a wireless technology. Apparatus 400 can also include a configuring unit 420 that configures the data to be transmitted via at least one wireless channel. Apparatus 400 can also include a transmitting unit 430 that transmits the data via the at least one wireless channel to a user device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

I claim:

1. A method, comprising:
    receiving, by a routing device, data via a wide pipeline, wherein the wide pipeline comprises a cable technology, an electrical wiring technology, and a wireless technology that are all bonded together;
    converting the data received via the bonded technologies of the wide pipeline into data to be transmitted via at least one wireless channel;
    transmitting the converted data via the at least one wireless channel to a user device; and
    converting the bonded technologies into Wi-Gig channels.

2. The method of claim 1, wherein the cable technology corresponds to Multimedia over Coaxial technology.

3. The method of claim 1, wherein the electrical wiring technology corresponds to Homeplug technology.

4. The method of claim 1, wherein the wireless technology corresponds to Wi-Fi Certified ac.

5. The method of claim 1, wherein transmitting the converted data comprises transmitting the converted data to a virtual reality head set.

6. An apparatus, comprising:
    at least one processor; and
    at least one memory including computer program code,
    wherein the at least one memory and the computer program code are configured to, with the at least one processor, cause the apparatus at least to:

receive, by a routing device, data via a wide pipeline, wherein the wide pipeline comprises a cable technology, an electrical wiring technology, and a wireless technology that are all bonded together;

convert the data received via the bonded technologies of the wide pipeline into data to be transmitted via at least one wireless channel;

transmit the converted data via the at least one wireless channel to a user device; and convert the bonded technologies into Wi-Gig channels.

7. The apparatus of claim 6, wherein the cable technology corresponds to Multimedia over Coaxial technology.

8. The apparatus of claim 6, wherein the electrical wiring technology corresponds to Homeplug technology.

9. The apparatus of claim 6, wherein the wireless technology corresponds to Wi-Fi Certified ac.

10. The apparatus of claim 6, wherein transmitting the converted data comprises transmitting the converted data to a virtual reality head set.

11. A computer program, embodied on a non-transitory computer readable medium, the computer program, when executed by a processor, causes the processor to:

receive, by a routing device, data via a wide pipeline, wherein the wide pipeline comprises a cable technology, an electrical wiring technology, and a wireless technology that are all bonded together;

convert the data received via the bonded technologies of the wide pipeline into data to be transmitted via at least one wireless channel;

transmit the converted data via the at least one wireless channel to a user device; and convert the bonded technologies into Wi-Gig channels.

12. The computer program of claim 11, wherein the cable technology corresponds to Multimedia over Coaxial technology.

13. The computer program of claim 11, wherein the electrical wiring technology corresponds to Homeplug technology.

14. The computer program of claim 11, wherein the wireless technology corresponds to Wi-Fi Certified ac.

15. The computer program of claim 11, wherein transmitting the converted data comprises transmitting the converted data to a virtual reality head set.

* * * * *